United States Patent [19]

Sakashita et al.

[11] Patent Number: 5,880,248
[45] Date of Patent: Mar. 9, 1999

[54] POLYCARBONATE, COPOLYCARBONATE RESIN COMPOSITIONS AND PREPARING METHOD THEREOF

[75] Inventors: Takeshi Sakashita, Utsunomiya; Tomoaki Shimoda, Moka; Takashi Nagai, Utsunomiya, all of Japan

[73] Assignee: General Electric Company, Pittsfield, Mass.

[21] Appl. No.: 41,897

[22] Filed: Mar. 13, 1998

Related U.S. Application Data

[62] Division of Ser. No. 820,872, Mar. 20, 1997, which is a division of Ser. No. 555,100, Dec. 1, 1995, Pat. No. 5,646,233.

[30] Foreign Application Priority Data

Dec. 28, 1994 [JP] Japan ................................. 6-327767

[51] Int. Cl.$^6$ .................................................. C08G 64/00
[52] U.S. Cl. ............................................................ 528/196
[58] Field of Search ..................................... 528/176, 171, 528/193, 219, 196

[56] References Cited

U.S. PATENT DOCUMENTS 3,489,716  1/1970  Calkins et al. .......................... 528/196
3,879,347  4/1975  Serini et al. ............................. 528/196
5,646,233  7/1997  Sakashita et al. ....................... 528/176

*Primary Examiner*—Terressa Mosley

[57] ABSTRACT

A copolycarbonate containing the component units shown in Formula [I] below in the amount of 50–99 mole %:

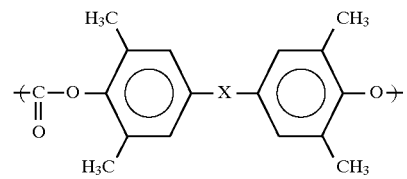

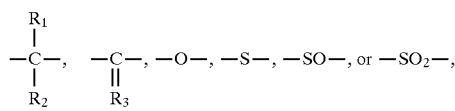

R1 and R2 are hydrogen atoms or monovalent hydrocarbon groups, and R3 is a bivalent hydrocarbon group.) The Rockwell hardness (M scale) of this polycarbonate should preferably be 45–90.

3 Claims, No Drawings

POLYCARBONATE, COPOLYCARBONATE RESIN COMPOSITIONS AND PREPARING METHOD THEREOF

This is a divisional of application Ser. No. 08/820,872 filed on Mar. 20, 1997, which is a divisional of Ser. No. 08/555,100, filed on Dec. 1, 1995, now issued U.S. Pat. No. 5,646,233.

The present invention relates to a polycarbonate having outstanding thermal resistance, outstanding color-matching properties and transparency, and in particular, improved hardness, a copolycarbonate composition, and a method for their manufacture.

Polycarbonate, which shows outstanding mechanical properties such as impact resistance and is also outstanding in thermal resistance, transparency, etc., is in widespread use.

This type of polycarbonate is ordinarily manufactured by methods involving direct reaction of ordinary bisphenol A (an aromatic dihydroxy compound) and phosgene (surface method), or by melt methods, etc., in which an aromatic dihydroxy compound such as bisphenol A and a carbonic acid diester such as diphenyl carbonate are subjected to an ester exchange reaction in a molten state (polycondensation reaction).

Of these methods, when polycarbonate is manufactured by the melt method, there is no need to use phosgene as a raw material, and polycarbonate can be manufactured at a lower cost than in the surface method.

It cannot be said that conventional polycarbonate, which is usually manufactured using bisphenol A as the aromatic dihydroxy compound, shows sufficiently outstanding hardness. For example, as polycarbonate does not offer sufficient harness (surface hardness) for outdoor applications such as automobile headlights, lenses for glasses, and sheets when used as is, a hard coating layer, etc., must be applied to the surface before use.

For this reason, there is a need for a polycarbonate showing outstanding hardness which can be used as is in outdoor applications without requiring application of a hard coating layer to the surface. There is also a need for a polycarbonate showing outstanding color matching and outstanding thermal resistance which will not undergo discoloration, etc., even under high-temperature conditions such as during melt molding.

The purpose of the present invention is to provide a new copolycarbonate and copolycarbonate composition which show outstanding thermal resistance, outstanding color-matching properties and transparency, and have improved hardness, as well as a method for their manufacture, in order to solve the problems of conventional technology described above.

The copolycarbonate of the present invention is a copolycarbonate containing units derived from 2 or more kinds of aromatic dihydroxy compounds, characterized by containing the component units shown in Formula [I] below in the amount of 50–99 mole %:

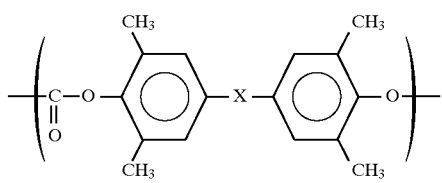

In the formula,

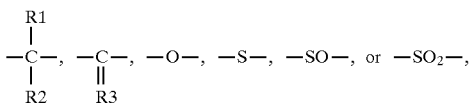

$R^1$ and $R^2$ are hydrogen atoms or monovalent hydrocarbon groups, and $R^3$ is a bivalent hydrocarbon group.

The intrinsic viscosity [IV] of the copolycarbonate of the present invention should preferably be 0.2–1.2 dl/g.

The Rockwell hardness (M scale) of the copolycarbonate of the present invention should preferably be 45–90.

The copolycarbonate of the present invention described above shows outstanding thermal resistance and color-matching properties, and in particular, shows outstanding hardness.

In the method for manufacturing copolycarbonate of the present invention, an aromatic dihydroxy compound containing the aromatic dihydroxy compound shown in General Formula [II] below in the amount of 50–99 mole % and a carbonic acid diester are subjected to melt polycondensation in the presence of a catalyst containing (a) an alkali metal compound and/or alkaline earth metal compound.

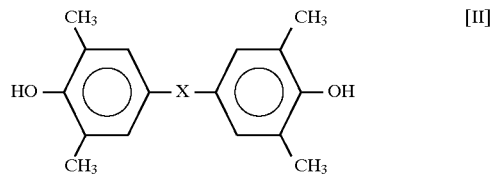

In the formula, X is the same as in Formula [I].

Moreover, the copolycarbonate composition of the present invention is composed of [A] the aforementioned copolycarbonate, [B] an acidic compound, and as necessary, [C] an epoxy compound.

The method for manufacturing a copolycarbonate composition of the present invention is characterized in that an aromatic dihydroxy compound containing the aromatic dihydroxy compound shown in General Formula [II] below in the amount of 50–99 mole % and a carbonic acid diester are subjected to melt polycondensation in the presence of a catalyst containing (a) an alkali metal compound and/or alkaline earth metal compound, and [B] an acidic compound, and as needed, [C] an epoxy compound are added to [A] the copolycarbonate obtained.

Furthermore, in the present invention, after adding [B] the acidic compound and, as needed, [C] the epoxy compound to [A] the copolycarbonate as described above, it is preferable to carry out reduced-pressure treatment.

The copolycarbonate composition of the present invention shows outstanding thermal resistance and color-matching properties, it is outstanding in molding retention stability, water resistance, and weather resistance, and it also remains stable in a molten state for long periods.

Moreover, in manufacturing the copolycarbonate composition of the present invention, when reduced-pressure treatment is carried out during manufacturing, substances such as residual monomers or oligomers in the polymer are reduced, making it possible to reduce soiling of the metal mold during molding and to obtain a copolycarbonate composition which has outstanding properties such as molding stability.

The following is a specific explanation of the copolycarbonate, copolycarbonate composition, and method for their manufacture of the present invention.

Copolycarbonate

The copolycarbonate of the present invention is a copolycarbonate containing units derived from 2 or more kinds of aromatic dihydroxy compounds and containing the component units shown in Formula [I] below in the amount of 50–99 mole %:

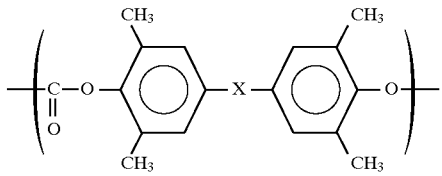

In the formula,

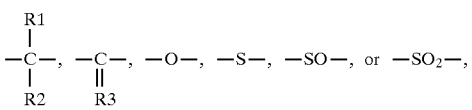

$R^1$ and $R^2$ are hydrogen atoms or monovalent hydrocarbon groups, and $R^3$ is a bivalent hydrocarbon group.

Examples of this monovalent hydrocarbon group include methyl, ethyl, n-propyl, i-propyl, n-butyl, i-butyl, t-butyl, pentyl, hexyl, cyclohexyl, heptyl, octyl, nonyl, decyl, phenyl, methylphenyl, butylphenyl, and naphthyl, and examples of bivalent hydrocarbon groups include ethylidene, propylidene, butylidene, and benzylidene.

The aforementioned component units shown in Formula [I] are derived from the following aromatic dihydroxy compound [II] and a carbonic acid diester or phosgene.

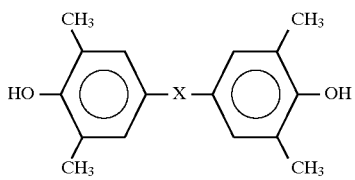

In the formula, X is the same as in Formula [I].

Specific examples of the aromatic dihydroxy compound shown in General Formula [II] include 1,1-bis(4-hydroxy-3,5-dimethylphenyl)methane, 1-phenyl-1,1-bis(4-hydroxy-3,5-dimethylphenyl)methane, 1,1-diphenyl-1,1-bis(4-hydroxy-3,5-dimethylphenyl)methane 1,1-bis(4-hydroxy-3,5-dimethylphenyl)ethane, 2,2-bis(4-hydroxy-3,5-dimethylphenyl)propane, 1,1-bis(4-hydroxy-3,5-dimethylphenyl)butane, 1,1-bis(4-hydroxy-3,5-dimethylphenyl)cyclopentane, 1,1-bis(4-hydroxy-3,5-dimethylphenyl)cyclohexane, 4,4'-dihydroxy-3,5,3',5'-tetramethyldiphenyl ether, 4,4'-dihydroxy-3,5,3',5'-tetramethyldiphenyl sulfide, 4,4'-dihydroxy-3,5,3',5'-tetramethyldiphenyl sulfoxide, and 4,4'-dihydroxy-3,5,3',5'-tetramethyldiphenyl sulfone.

Among these substances, 1,1-bis(4-hydroxy-3,5-dimethylphenyl)methane, 1,1-diphenyl-1,1-bis(4-hydroxy-3,5-dimethylphenyl)methane, and 2,2-bis(4-hydroxy-3,5-dimethylphenyl)propane are preferred.

The compound shown by Formula [II] above may be synthesized using xylenol as a raw material.

Moreover, the other component units making up the copolycarbonate of the present invention are derived from aromatic dihydroxy compounds other than the one shown by Formula II, a carbonic acid diester, or phosgene.

There are no particular limitations on these other aromatic dihydroxy compounds, and specific examples include bis(hydroxyaryl)alkanes such as bis(4-hydroxyphenyl)methane, 1,1-bis(4-hydroxyphenyl)ethane, 2,2-bis(4hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, bis(hydroxyaryl)cycloalkane such as 1,1-bis(4-hydroxyphenyl)cyclopentane or 1,1-bis(4-hydroxyphenyl)cyclohexane; a dihydroxyaryl ether such as 4,4'-dihydroxydiphenyl ether or 4,4'-dihydroxy-3,3'-dimethylphenyl ether;

a dihydroxydiaryl sulfide such as 4,4'-dihydroxydiphenyl sulfide or 4,4'-dihydroxy-3,3'-dimethylphenyl sulfide;

a dihydroxydiaryl sulfoxide such as 4,4'-dihydroxydiphenyl sulfoxide or 4,4'-dihydroxy-3,3'-dimethyldiphenyl sulfoxide;

or a dihydroxydiaryl sulfone such as 4,4'-dihydroxydiphenyl sulfone or 4,4'-dihydroxy-3,3'-dimethyldiphenyl sulfone.

Among these compounds, the use of 2,2-bis(4-hydroxyphenyl)propane (bisphenol A) is particularly preferred.

In the copolycarbonate of the present invention, the component units shown by formula [I] and the other component units are randomly arranged.

The copolycarbonate of the present invention contains the component units shown by Formula [I] above in the amount of 50–99 mole %, and said component units shown by Formula [I] should be contained in the amount of 55–95 mole %, or preferably 60–90 mole %, with the amount of 65–85 mole % being particularly preferred.

The copolycarbonate of the present invention, which contains the component units shown by Formula [I] above in the above proportions, shows particularly outstanding hardness. Moreover, if the component units shown by Formula [I] are contained in the amount of 49 mole % or less, the hardness of the copolycarbonate will not be sufficiently improved.

In addition to the component units shown in Formula [I] and the units derived from other aromatic dihydroxy compounds, the copolycarbonate of the present invention may also contain units derived from a dicarboxylic acid or a dicarboxylic acid ester, provided that this does not adversely affect the purpose of the present invention.

Examples of the dicarboxylic acid or carboxylic acid ester include terephthalic acid, isophthalic acid, sebacic acid, decanedioic acid, dodecanedioic acid, diphenyl sebacate, diphenyl terephthalate, diphenyl isophthalate, diphenyl decanedioate, and diphenyl dodecanedioate.

For example, taking the unit derived from a carbonic acid diester as 100 mole %, the copolycarbonate of the present invention may contain the aforementioned unit derived from a dicarboxylic acid or dicarboxylic acid ester in the amount of 50 mole % or less, and preferably 30 mole % or less.

This type of copolycarbonate derived from a dicarboxylic acid or dicarboxylic acid ester, an aromatic dihydroxy compound, and a carbonic acid diester or phosgene is also referred to as polyester copolycarbonate.

Moreover, the copolycarbonate of the present invention may also contain a unit derived from a multifunctional compound having 3 or more functional groups per molecule, provided that this does not adversely affect the purpose of the invention. This multifunctional compound should preferably be a compound having 3 or more phenolic hydroxyl groups or carboxyl groups per molecule, with a compound containing 3 phenolic hydroxyl groups being particularly preferred.

Specific examples of this multifinctional compound include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, phloroglucinol, 4,6-dimethyl-2,4-6-tris(4-hydroxyphenyl)-2-heptane [sic], 1,3,5-tris(4-hydroxyphenyl)benzene, 2,2-bis4,4-(4,4'-dihydroxyphenyl)cyclohexylpropane, trimellitic acid, 1,3,5-benzenetricarboxylic acid, and pyromellitic acid.

Among these substances, the use of 1,1,1-tris(4-hydroxyphenyl)ethane or α,α'-α"-tris(4-hydroxyphenyl)-1, 3,5-triisopropylbenzene, etc., is particularly preferred.

Taking the unit derived from an aromatic dihydroxy compound as 100 mole %, the copolycarbonate of the present invention should preferably contain this type of unit derived from a multifunctional compound in the amount of 3 mole % or less, and preferably 0.1–2 mole %, with the amount of 0.1–1 mole % being particularly preferred.

The intrinsic viscosity [IV] of the above copolycarbonate of the present invention should preferably be 0.2–1.2 dl/g, with 0.3–0.8 dl/g being particularly preferred. This IV value is measured using an Ubbelohde viscosimeter in methylene chloride at 20° C. (0.5 dl/g).

The Rockwell hardness (M scale) of the copolycarbonate of the present invention should be 45–90, and preferably 50–85.

The glass transition temperature (Tg) of the copolycarbonate of the present invention should preferably be 155°–200° C., with a temperature of 160°–190° C. being particularly preferable.

Furthermore, the yellowing index (YI) of the copolycarbonate of the present invention should ordinarily be 3 or less, with an index of 2.5 or less being preferred.

This yellowing index (YI) may be determined as follows.

X, Y, and Z values measured by the transmission method on a 3 mm thick polycarbonate press sheet using the ND-1001 DP Color and Difference meter manufactured by Nihon Denshoku Kogyo K. K. are used in the following equation to calculate the yellowing index.

$$YI=(100/Y)\times(1.277X-1.060Z)$$

The above copolycarbonate of the present invention has a higher Rockwell hardness value and superior hardness compared to ordinary bisphenol A polycarbonate.

Moreover, the copolycarbonate of the present invention also has a high glass transition temperature (Tg), has outstanding thermal resistance, shows a low yellowing index, and is outstanding in color-matching properties and transparency.

The above copolycarbonate of the present invention may be manufactured by methods using phosgene, or it may be manufactured by methods such as copolycarbonate oligomer solid phase polymerization, but it is preferable to manufacture it by the melt method described below.

In the present invention, it is preferable to manufacture the aforementioned copolycarbonate by subjecting an aromatic dihydroxy compound containing the aromatic dihydroxy compound shown in General Formula [II] below in the amount of 50–99 mole % and a carbonic acid diester to melt polycondensation in the presence of a catalyst containing (a) an alkali metal compound and/or alkaline earth metal compound.

Examples of the aromatic dihydroxy compound shown in Formula [II] and other aromatic dihydroxy compounds used in this melt polycondensation reaction are the compounds specified in the above explanation of the component units of the copolycarbonate. Among these substances. Of these substances, compounds such as 1,1-bis(4-hydroxy-3,5-dimethylphenyl)methane, 1,1-diphenyl-1,1-bis(4-hydroxy-3,5-dirnethylphenyl)methane, and 2,2-bis(4-hydroxy-3,5-dimethylphenyl)propane should preferably be used as the aromatic dihydroxy compound of General Formula [II], and bisphenol A should preferably be used as the other aromatic dihydroxy compound.

Concerning the aromatic dihydroxy compound used in the present invention, the aromatic dihydroxy compound shown in Formula [I] should be used in the amount of 50–90 mole %, preferably, 55–95 mole %, and more preferably, 60–90 mole %, with the amount of 65–85 mole % being particularly preferred.

Moreover, specific examples of the carbonic acid diester used in the present invention include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate.

Among these substances, diphenyl carbonate is particularly preferred.

In the present invention, the aforementioned carbonic acid diester may include, as mentioned above, a dicarboxylic acid or dicarboxylic acid ester in the amount of 50 mole % or less in 100 mole % of the carbonic acid diester, with the amount of 30 mole % or less being preferred.

In manufacturing the copolycarbonate of the present invention, the aforementioned carbonic acid diester should preferably be included in the amount of 1.0–1.30 moles with respect to a total of 1 mole of the aromatic dihydroxy compound, or preferably 1.01–1.20 moles, with the amount of 1.01–1.10 moles being particularly preferred.

Moreover, in manufacturing the copolycarbonate of the present invention, together with the aforementioned aromatic dihydroxy compound and the carbonic acid diester, the aforementioned multifunctional compound having 3 or more functional groups per molecule may be used.

This multifunctional compound should ordinarily be used in the amount of 0.03 moles or less with respect to a total of 1 mole of the aromatic dihydroxy compound, or preferably 0.001–0.02 moles, with the amount of 0.001–0.1 moles being particularly preferred.

In the method for manufacturing copolycarbonate of the present invention, the aforementioned aromatic dihydroxy compound and carbonic acid diester are subjected to polycondensation in the presence of a catalyst containing (a) an alkali metal compound and/or alkaline earth metal compound.

Specific preferred examples of this (a) alkali metal compound and/or alkaline earth metal compound (referred to in the following as (a) an alkali compound) include organic acid salts, inorganic acid salts, oxides, hydroxides, hydrides, and alcoholates of alkali metals and/or alkaline earth metals.

More specifically, examples of this alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium hydroxyborate, lithium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, etc.

Furthermore, specific examples of the alkaline earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

These substances may be used in combinations of 2 or more.

In the present invention, (a) the alkali compound should be used in the amount of $1 \times 10^{-8}$ to $1 \times 10^{-3}$ moles with respect to a total of 1 mole of the aromatic dihydroxy compound, or preferably $5 \times 10^{-8}$ to $2 \times 10^{-6}$ moles, with the amount of $1 \times 10^{-7}$ to $1 \times 10^{-6}$ moles being particularly preferred.

When (a) the alkali compound is used in the amount of $1 \times 10^{-8}$ to $1 \times 10^{-3}$ moles with respect to 1 mole of the aromatic dihydroxy compound, polymerization activity can be maintained at a high level, and one can manufacture a copolycarbonate having outstanding color-matching properties. Moreover, a copolycarbonate compound is manufactured by adding an acidic compound to the copolycarbonate produced, as mentioned below, and at this time, it is possible to sufficiently neutralize or weaken the basicity of these alkali compounds by using the acidic compound in an amount which does not adversely affect the properties of the copolycarbonate, thus making it possible to obtain a copolycarbonate composition which is outstanding in color-matching properties, thermal resistance, water resistance, and weather resistance, and which shows outstanding melt stability over long periods.

In the present invention, together with the aforementioned (a) alkali compound used as a catalyst, one may also use (b) a nitrogen-containing basic compound and (c) a boric acid compound.

This (b) nitrogen-containing basic compound may be a nitrogen-containing basic compound which readily decomposes or shows volatility at high temperatures, with examples including the following compounds.

Ammonium hydroxides having alkyl, aryl, and aralkyl groups, such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($\phi-CH_2(Me)_3NOH$), etc., tertiary amines such as trimethylamine, triethylamine, dimethylbenzylamine, and triphenylamine, secondary amines indicated by the formula $R_2NH$ (in the formula, R indicates an alkyl group such as methyl or ethyl or an aryl group such as phenyl or tolyl), primary amines indicated by the formula $RNH_2$ (in the formula, R has the same meaning as indicated above), pyridines such as 4-dimethylaminopyridine, 4-diethylaminopyridine, and 4-pyrrolidinopyridine, imidazoles such as 2-methylimidazole and 2-phenylimidazole, or basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$), and tetramethylammonium tetraphenylborate ($Me_4NBPh_4$).

Of these substances, tetraalkylammonium hydroxides, particularly tetraalkylammonium hydroxides for electronic use which have a low content of metal impurities, are particularly preferable.

The aforementioned (b) nitrogen-containing basic compound should be included in the amount of $10^{-6}$ to $10^{-1}$ moles, or preferably $10^{-5}$ to $10^{-2}$ moles, with respect to 1 mole of the aromatic dihydroxy compound.

Moreover, examples of this type of (c) boric acid compound include boric acid and boric acid esters.

As an example of a boric acid ester, one can mention a boric acid ester having the following general formula.

$B(OR)_n(OH)_{3-n}$

In the formula, R indicates an alkyl group such as methyl or ethyl or an aryl group such as phenyl, and n is the integer 1,2, or 3.

Specific examples of this boric acid ester include trimethyl borate, triethyl borate, tributyl borate, trihexyl borate, triheptyl borate, triphenyl borate, tritolyl borate, and trinaphthyl borate.

The (c) boric acid or boric acid ester should be used in the amount of $10^{-8}$ to $10^{-1}$ moles, and preferably $10^{-7}$ to $10^{-2}$ moles, with respect to a total of 1 mole of the aromatic dihydroxy compound, with the amount of $10^{-6}$ to $10^{-4}$ moles being particularly preferred.

In the present invention, as mentioned above, one should preferably use a combination of (a) an alkali compound and (b) a nitrogen-containing basic compound, a combination of (a) an alkali compound and (c) boric acid or a boric acid ester, or a combination of (a) an alkali compound, (b) a nitrogen-containing basic compound, and (c) boric acid or a boric acid ester as a catalyst.

When a combination of (a) an alkali compound and (b) a nitrogen-containing basic compound is used as a catalyst, this makes it possible to carry out the polycondensation reaction with a high level of activity and to produce high-molecular-weight copolycarbonate which shows outstanding thermal resistance, water resistance, color-matching properties, and transparency.

Moreover, when a combination of (a) an alkali compound and (c) boric acid or a boric acid ester is used, it is possible to carry out an ester exchange reaction and a polycondensation reaction at a sufficiently high rate and to produce a polycarbonate which shows outstanding color-matching properties, thermal resistance, and water resistance. In particular, it is preferable to use (c) boric acid or a boric acid ester in the amount specified above in order to obtain a copolycarbonate which is resistant to decreases in molecular weight following thermal aging.

Moreover, in the present invention, one may use the following acidic catalysts in combination with the above-mentioned catalysts.

Examples of these acidic catalysts include Lewis acid compounds such as the following:

zinc compounds such as zinc borate, zinc acetate, zinc oxalate, zinc phenylacetate, zinc chloride, zinc sulfate, zinc nitrate, zinc carbonate, zinc oxide, zinc hydroxide, zinc stearate, zinc-chromium oxide, and zinc-chromium-copper oxide, cadmium compounds such as cadmium acetate, cadmium oxalate, cadmium oxide, and cadmium stearate, silicon compounds such as silicon oxide, silica alumina, and silica magnesia, germanium compounds such as germanium oxide and germanium hydroxide, tin compounds such as stannous acetate, stannous oxalate, tin octanoate, stannous chloride, stannic chloride, stannous oxide, stannic oxide, and tetraphenyltin, lead compounds such as lead acetate, lead borate, lead citrate, lead hydroxide, lead oxide, lead phosphates, lead phthalate, and lead stearate, antimony compounds such as antimony acetate, antimony oxalate, triphenylantimony, antimony trioxide, antimony pentoxide, triphenoxyantimony, trimethoxyantimony, and antimony trichloride, bismuth compounds such as bismuth acetate, bismuth oxalate, triphenylbismuth, bismuth trioxide, and bismuth trichloride, and titanium compounds such as titanium trichloride, titanium tetrachloride, titanium dioxide, tetraphenoxytitanium, and tetraisopropoxytitanium.

A condensation polymerization reaction of this type carried out with an aromatic dihydroxy compound and a carbonic acid diester using a catalyst may be carried out under the same conditions known for conventional melt polycondensation of an aromatic dihydroxy compound and a carbonic acid diester.

Specifically, in the first stage, the aromatic dihydroxy compound and the carbonic acid diester are reacted at 80°–250° C., and more preferably 100°–230° C., with a temperature of 120°–190° C. being particularly preferred, and at ordinary pressure, usually for 0–5 minutes, and more preferably for 0–4 minutes, with a duration of 0–3 minutes being particularly preferred.

Next, while keeping the reaction system at reduced pressure, the reaction temperature is increased, the aromatic dihydroxy compound and carbonic acid diester are reacted, and finally, polycondensation of the aromatic dihydroxy compound and the carbonic acid diester is ordinarily carried out at a pressure of 5 mmHg or less, and preferably 1 mmHg or less, and at a temperature of 240°–320° C.

The reaction described above may be carried out continuously or by the batch method. Moreover, the reaction equipment used in carrying out the above reaction may be of the tank type, the tube type, or the tower type.

The copolycarbonate composition of the present invention consists of the aforementioned [A] copolycarbonate and

[B] an acidic compound.

Moreover, the copolycarbonate composition of the present invention should preferably also contain [C] an epoxy compound.

The [A] copolycarbonate contains the aforementioned (a) alkali metal compound or alkaline earth metal compound used as a catalyst during manufacturing.

The [B] acidic compound used in the present invention may be a Lewis acid compound, a Brønsted acid compound, or a strongly acidic sulfur-atom-containing ester, provided that the (a) alkali metal compound or alkaline earth metal compound of [A] the copolycarbonate can be neutralized.

[B] The acidic compound used in the present invention should preferably have a pKa value of 3 or less in an aqueous solution at 25° C.

By using an acidic compound having this pKa value, it is possible to neutralize the alkali metal or alkaline earth metal compound used as a catalyst, thereby providing the advantage of allowing stabilization of the copolycarbonate obtained.

Specific examples of Lewis acids include boron compounds such as zinc borate and boron phosphates, boric acid esters such as $B(OCH_3)_3$, $B(OEt)_3$, and $B(OPh)_3$, aluminum compounds such as aluminum stearate and aluminum silicate, zirconium compounds such as zirconium carbonate, zirconium alkoxide, and zirconium bicarbonate, gallium compounds such as gallium phosphate and gallium antimonide, germanium compounds such as germanium oxide and organic germanium, tetra- or hexaorganotin, tin compounds such as $PhOSn(Bu)_2OSn(Bu)_2OPh$, antimony compounds such as antimony oxide and alkyl antimony, bismuth compounds such as bismuth oxide and alkylbismuth, zinc compounds such as $(CH_3COO)_2Zn$ and zinc stearate, and titanium compounds such as alkoxytitanium and titanium oxide.

Moreover, in the above formulas, Ph indicates a phenyl group, Et an ethyl group, and Bu a butyl group.

Specific examples of Brønsted acid compounds include phosphoric acid, phosphorous acid, hypophosphorous acid, pyrophosphoric acid, polyphosphoric acid, boric acid, hydrochloric acid, hydrobromic acid, sulfric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfmic acid, toluenesulfmic acid, and sulfonic acid compounds such as benzenesulfonic acid, p-toluenesulfonic acid, trifluoromethanesulfonic acid, naphthalenesulfonic acid, sulfonated polystyrene, and methyl acrylate-sulfonated styrene copolymer.

Specific examples of the ester of the sulfur-containing acid include compounds whose acid residue portion has a pKa value of 3 or less such as dimethyl sulfate, diethyl sulfate, methyl, ethyl, butyl, octyl, or phenyl esters of p-toluenesulfonic acid, methyl, ethyl, butyl, octyl, and phenyl esters of benzenesulfonic acid, etc.

Among this type of [B] acidic compound, acidic compounds containing sulfur atoms, phosphorus atoms, etc., are preferred, with acidic compounds containing sulfur atoms being particularly preferred.

These substances may also be used in combinations of 2 or more.

The polycarbonate composition of the present invention should contain the aforementioned [B] acidic compound in an amount which is capable of neutralizing or weakening the effect of the alkalinity of (a) the alkali compound, etc., present as a residue in [A] the copolycarbonate, and specifically, in the amount of 0.1–50 moles with respect to 1 mole of the (a) alkali compound of [A] the copolycarbonate, with the amount of 0.5–30 moles being preferred.

In particular, in cases where [B] the acidic compound is a Lewis acid or a Brønsted acid having a pKa value greater than 3, it should be used in the amount of 0.1–50 moles, and preferably 0.1–30 moles, and in cases where [B] the acidic compound is a Brønsted acid having a pKa value of 3 or less or an ester of a sulfur-atom-containing acid, it should be used in the amount of 0.1–50 moles, and preferably 0.1–15 moles, with the amount of 0.1–7 moles being particularly preferred.

Moreover, the copolycarbonate composition of the present invention may also contain a specified amount of water, specifically 5–1,000 ppm with respect to [A] the copolycarbonate, or preferably 10–500 ppm, with the amount of 20–300 ppm being particularly preferred.

This type of polycarbonate composition, in which a specified amount of water is included together with [B] the acidic compound, provides high neutralization efficacy of the basic catalyst in [A] the copolycarbonate, providing polycarbonate with improved retention stability during melting as well as outstanding color-matching properties, transparency, water resistance, and weather resistance.

When water is contained in amounts greater than 1,000 ppm, the polycarbonate readily tends to undergo hydrolysis, and this may adversely affect the physical properties of the polycarbonate.

Moreover, the copolycarbonate composition of the present invention should preferably contain [C] an epoxy compound in the amount of 0.0001–0.2 parts by weight with respect to 100 parts by weight of [A] the copolycarbonate, or preferably 0.001–0.1 parts by weight.

Moreover, as the [C] epoxy compound of the present invention, a compound is used which has one or more epoxy groups per molecule. Specific examples include the following: epoxidized soy bean oil, epoxidized linseed oil, phenyl glycidyl ether, allyl glycidyl ether, t-butylphenyl glycidyl ether, 3,4-epoxycyclohexylmethyl 3',4'-epoxycyclohexanecarboxylate, 3,4-epoxy-6-methylcyclohexylmethyl 3',4'-epoxy-6'-methylcyclohexanecarboxylate, 2,3-epoxycyclohexylmethyl 3',4'-epoxycyclohexanecarboxylate, 4-(3,4-epoxy-5-methylcyclohexyl)butyl 3',4'-epoxycyclohexanecarboxylate, 3,4-epoxycyclohexylethylene oxide, cyclohexylmethyl 3,4-epoxycyclohexanecarboxylate, 3,4-epoxy-6-methylcyclohexylmethyl 6'-methylcyclohexanecarboxylate, bisphenol A diglycidyl ether, tetrabromobisphenol A glycidyl ether, diglycidyl ester of phthalic acid, diglycidyl esters of hexahydrophthalic acid, bisepoxydicyclopentadienyl ether, bisepoxyethylene glycol, bisepoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl 2,2-dimethyl-3,4-epoxycyclohexanecarboxylate, n-butyl 2,2-dimethyl-3,4-epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4-epoxycyclohexanecarboxylate, 2-ethylhexyl 3',4'-epoxycyclohexanecarboxylate, 4,6-dimethyl-2,3-epoxycyclohexyl 3',4'-epoxycyclohexanecarboxylate, 4,5-epoxytetrahydrophthalic anhydride, 3-t-butyl-4,5-epoxytetrahydrophthalic anhydride, diethyl 4,5-epoxy-cis-1,2-cyclohexanedicarboxylate, and di-n-butyl 3-t-butyl-4,5-epoxy-cis-1,2-cyclohexanedicarboxylate.

These substances may be also used in combinations of 2 or more.

In this type of copolycarbonate composition containing [C] an epoxy compound, even when an excessive amount of [B] the acidic compound remains in the form of residue, this can be neutralized by reaction with [C] the epoxy compound, thus providing copolycarbonate which has outstanding hardness and thermal resistance, as well as properties such as outstanding color matching, transparency, water resistance, and weather resistance.

The copolycarbonate composition of the present invention not only shows outstanding thermal resistance, color-matching properties, transparency, water resistance, and weather resistance, it also makes it possible to obtain copolycarbonate molded products which show color-matching stability for long periods of use, thus making it highly suitable for use in various applications such as optical applications including sheets, lenses, and compact discs, outdoor applications such as automobiles, and applications such as housings for various types of machinery.

The copolycarbonate composition of the present invention is manufactured by subjecting an aromatic dihydroxy compound containing a specified amount of the aforementioned aromatic dihydroxy compound [II] and a carbonic acid diester to copolymerization to manufacture [A] the polycarbonate, and then adding [B] an acidic compound and, as needed, [C] an epoxy compound to [A] the copolycarbonate obtained.

In the method of manufacturing a copolycarbonate composition of the present invention, there are no particular restrictions on the method for adding [A] the acidic compound and [C] the epoxy compound to [A] the copolycarbonate obtained as a reaction product of polycondensation, with an example being the method of adding [B] and [C] to [A] the copolycarbonate while it is in a molten state, thoroughly kneading the mixture, and then adding [B] and [C] to the solution of [A] the copolycarbonate and stirring the mixture.

More specifically, examples include the following:

the method of directly adding [B] the acidic compound and, as needed, [C] the epoxy compound, either separately or simultaneously, to [A] the copolycarbonate obtained in the polycondensation reaction, which is in a reaction vessel or extruder in a molten state, and then kneading, the method of pelletizing the [A] copolycarbonate obtained, placing these pellets in a monoaxial or biaxial extruder, etc., together with [B] the acidic compound, and as needed, [C] the epoxy compound, and then carrying out melt kneading, and the method of dissolving [A] the copolycarbonate in an appropriate solvent such as methyl chloride, chloroform, toluene, or tetrahydrofuran to prepare a solution, adding [B] the acidic compound, and as needed, [C] the epoxy compound to this solution either separately or simultaneously, and then stirring the mixture.

The [B] acidic compound and [C] epoxy compound may be added to [A] the copolycarbonate in any desired order.

In the method for manufacturing the copolycarbonate composition of the present invention, after [B] the acidic compound and, as needed, [C] the epoxy compound have been added to [A] the copolycarbonate obtained by polycondensation as described above, reduced-pressure treatment should preferably be carried out.

For example, reduced-pressure treatment of the copolycarbonate composition may be carried out using a reactor equipped with a reduced-pressure unit, or an extruder equipped with a reduced-pressure unit, etc.

The reactor equipped with a reduced-pressure unit may be either a vertical-type tank reactor or horizontal-type tank reactor, with the horizontal-type tank reactor being preferred.

Reduced-pressure treatment should preferably be carried out at a temperature of 240°–350° C.

When reduced-pressure treatment is carried out in the aforementioned reactor, this should be done under conditions of pressure of 0.05–750 mmHg, and preferably 0.05–5 mmHg, for a period of 5 minutes to 3 hours.

Moreover, when the reduced-pressure treatment is carried out in an extruder, this should be done under conditions of pressure of 1–750 mmHg, or preferably, 5–700 mmHg, for a period of 10 seconds to 15 minutes. The extruder used may be a monoaxial or biaxial extruder equipped with a vent, and pelletization may be carried out during reduced-pressure treatment of the copolycarbonate composition in the extruder.

When reduced-pressure treatment is carried out after adding the acidic compound, and as needed, the epoxy compound to the copolycarbonate which is the product of this reaction, one can obtain a copolycarbonate composition in which the content of residual monomers, oligomers. etc., has been reduced.

Moreover, provided that this does not adversely affect the purpose of the present invention, the copolycarbonate composition of the invention may include substances such as thermal resistance stabilizers, ultraviolet absorbers, mold releasing agents, colorants, antistatic agents, slipping agents, anti-blocking agents, lubricants, defogging agents, dyes, pigments, natural oils, synthetic oils, waxes, organic fillers, and inorganic fillers.

Among these additives, substances such as the thermal resistance stabilizers, ultraviolet absorbers, mold-releasing agents, and colorants mentioned below should preferably be used. These substances may also be used in combinations of two or more.

Specific examples of such thermal resistance stabilizers include phenolic stabilizers, organic thioether stabilizers, organic phosphite stabilizers, and hindered amine stabilizers.

Examples of phenolic stabilizers include
n-octadecyl 3-(4-hydroxy-3',5'-di-t-butylphenyl) propionate, tetrakis[methylene-3-(3',5'-di-t-butyl-4-hydroxyphenyl)propionate]methane, 1,1,3-tris(2-ethyl-4-hydroxy-5-t-butylphenyl)butane, distearyl (4-hydroxy-3-methyl-5-t-butyl)benzylmalonate, and 4-hydroxymethyl-2,6-di-t-butylphenol.

Examples of thioether stabilizers include
dilauryl thiodipropionate, distearyl thiodipropionate, dimyristyl 3,3'-thiodipropionate, ditridecyl 3,3'-thiodipropionate, and pentaerythritol tetrakis(beta-laurylthiodipropiomate).

Examples of organic phosphite stabilizers include
arylalkyl phosphites such as bis(2,4-di-t-butylphenyl) pentaerythrityl diphosphite, diphenyl decyl phosphite, diphenyl isooctyl phosphite, phenyl isooctyl phosphite, 2-ethylhexyl diphenyl phosphite, trialkyl phosphites such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl) phosphite, and tris(2,3-dichloropropyl) phosphite, tricycloalkyl phosphites such as tricyclohexyl phosphite, triaryl phosphites such as triphenyl phosphite, tricresyl phosphite, tris(ethylphenyl) phosphite, tris(2,4di-t-butylphenyl) phosphite, tris(nonylphenyl) phosphite, and tris(hydroxyphenyl) phosphite, trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl) phosphate, tricycloalkyl phosphates such as tricyclohexyl phosphate, triaryl phosphates such as triphenyl phosphate, tricresyl phosphate, tris(ethylphenyl) phosphate, tris(2,4-di-t-butylphenyl) phosphate, tris(nonylphenyl) phosphate, and tris(hydroxyphenyl) phosphate, trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl) phosphate, tricycloalkyl phosphates such as tricyclohexyl phosphate, and triaryl phosphates such as triphenyl phosphate, tricresyl phosphate, tris(nonylphenyl) phosphate, and 2-ethylphenyl diphenyl phosphate.

Moreover, examples of hindered amine stabilizers include
bis(2,2,6,6-tetramethyl-4-piperidyl) sebacate, bis(1,2,2,6,6-pentamethyl-4-piperidyl) sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidyl 8-benzyl-7,7,9,9-tetramethyl-3-octyl-1,2,3-triazaspiro[4,5]undecane-2,4-dione, 4-benzoyloxy-2,2,6,6-tetramethylpiperazine, bis(1,2,2,6,6-pentamethyl-4-piperidyl) 2-(3,5-di-t-butyl-4-hydroxybenzyl)-2-n-butylmalonate, and tetrakis(2,2,6,6-tetramethyl-4-piperidyl) 1,2,3,4-butanetetracarboxylate.

These substances may also be used in combinations of 2 or more. Moreover, these thermal resistance stabilizers may be added in either solid or liquid form.

In the copolycarbonate composition of the present invention, the thermal resistance stabilizer should be used in an amount of 0.001–5 parts by weight with respect to 100 parts by weight of [A] the copolycarbonate, and preferably 0.005–0.5 parts by weight, with an amount of 0.01–0.3 parts by weight being particularly preferred.

There are no particular restrictions on the ultraviolet absorber used in the present invention, with an ordinary ultraviolet absorber being suitable, such as a salicylic acid ultraviolet absorber, a benzophenone ultraviolet absorber, a benzotriazole ultraviolet absorber, or a cyanoacrylate ultraviolet absorber.

Specific examples of salicylic acid ultraviolet absorbers include phenyl salicylate and p-t-butylphenyl salicylate.

Examples of benzophenone ultraviolet absorbers include
2,4-dihydroxybenzophenone, 2-hydroxy-4-methoxybenzophenone,
2,2'-dihydroxy-4-methoxybenzophenone,
2,2'-dihydroxy-4,4'-dimethoxybenzophenone,
2-hydroxy-4-methoxy-2'-carboxybenzophenone,
2-hydroxy-4-methoxy-5-sulfobenzophenone trihydrate,
2-hydroxy-4-n-octyloxybenzophenone, 2,2',4,4'-tetrahydroxybenzophenone,
4-dodecyloxy-2-hydroxybenzophenone,
bis(5-benzoyl-4-hydroxy-2-methoxyphenyl)methane, and
2-hydroxy-4-methoxybenzophenone-5-sulfonic acid.

Examples of benzotriazole ultraviolet absorbers include
2-(2'-hydroxy-5'-methylphenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4",5",6"-tetrahydrophthalidomethyl)-5'-methylphenyl]benzotriazole, and 2,2'-methylenebis[4-(1,1,3,3-tetramethylbutyl)-6-(2H-benzotriazol-2-yl)phenol].

Examples of cyanoacrylate ultraviolet absorbers include 2-ethylhexyl 2-cyano-3,3-diphenylacrylate and ethyl 2-cyano-3,3-diphenylacrylate. These substances may also be used in combinations of 2 or more.

In the copolycarbonate composition of the present invention, the ultraviolet absorber should be used in an amount of 0.001–5 parts by weight with respect to 100 parts by weight of [A] the copolycarbonate, and preferably 0.005–1.0 part by weight, with an amount of 0.01–0.5 parts by weight being particularly preferred.

Moreover, there are no particular restrictions on mold-releasing agents, with a general mold-releasing agent being suitable.

For example, examples of hydrocarbon mold-releasing agents include natural and synthetic paraffins, polyethylene waxes, and fluorocarbons.

Examples of fatty acid mold-releasing agents include higher fatty acids such as stearic acid and hydroxystearic acid and oxy fatty acids.

Examples of fatty acid amine mold-releasing agents include fatty acid amides such as stearic acid amide and ethylenebisstearamide and alkylenebis(fatty acid amide).

Examples of alcohol mold-releasing agents include aliphatic alcohols such as stearyl alcohol and cetyl alcohol, polyvalent alcohols, polyglycol, and polyglycerol.

Examples of fatty acid ester mold-releasing agents include fatty acid lower alcohol esters such as butyl stearate and pentaerythritol tetrastearate, fatty acid polyvalent alcohol esters, and fatty acid polyglycol esters.

Examples of silicone mold-releasing agents include silicone oil, and these substances may also be used in combinations of 2 or more.

In the copolycarbonate composition, the mold-releasing agent is ordinarily used in the amount of 0.001–5 parts by weight with respect to 100 parts by weight of [A] the copolycarbonate, and preferably 0.005–1 part by weight, with the amount of 0.01–0.5 parts by weight being particularly preferred.

The colorant used may be a pigment or a dye. Moreover, either inorganic or organic colorants may be used, or a combination of the two may be used.

Specific examples of inorganic colorants include oxides such as titanium dioxide and red iron oxide, hydroxides such as aluminum white, sulfides such as zinc sulfide, selenium, ferrocyanides such as Prussian blue, chromates such as zinc chromate and molybdenum red, sulfates such as barium sulfate, carbonates such as calcium carbonate, silicates such as ultramarine, phosphates such as manganese violet, carbons such as carbon black, and metal powder colorants such as bronze powder and aluminum powder.

Specific examples of organic colorants include nitroso colorants such as naphthol green B, nitro colorants such as naphthol yellow S, azo colorants such as lithol red, Bordeaux 10B, naphthol red, and chromophthal yellow, phthalocyanine colorants such as phthalocyanine blue and fast sky blue, and condensation polycyclic colorants such as indanthrone blue, quinacridone violet, and dioxazine violet.

In the copolycarbonate composition of the present invention, these colorants are ordinarily used in the amount of $1 \times 10^{-6}$ to 5 parts by weight with respect to 100 parts by weight of [A] the copolycarbonate, and preferably $1 \times 10^{-5}$ to 3 parts by weight, with the amount of $1 \times 10^{-5}$ to 1 part by weight being particularly preferred.

In the present invention, when the other compounds mentioned above, particularly thermal stabilizers, are added to [A] the copolycarbonate in the same manner as [B] or [C] when it is in a molten state, it becomes possible to manufacture a copolycarbonate composition which is heated only a small number of times during manufacturig, a desirable result. Moreover, as the pellets of the polycarbonate composition obtained contain thermal stabilizers, it is possible to control thermal decomposition during remelting.

Depending on the purpose, other polymers, compounding agents, etc., may be blended into the polycarbonate or copolycarbonate composition of the present invention.

Effect of the Invention

The new polycarbonate of the present invention is outstanding in hardness and thermal resistance, and also shows outstanding color-matching properties and transparency.

By using the method for manufacturing copolycarbonate of the present invention, it becomes possible to manufacture the above copolycarbonate inexpensively. Moreover, because substances such as phosgene are not used, this is preferable from the standpoint of environmental hygiene.

Moreover, the copolycarbonate composition of the present invention shows outstanding hardness and thermal resistance, as well as outstanding transparency and color-matching properties, and it is particularly outstanding in color-matching stability when used over long periods.

The polycarbonate or copolycarbonate composition of the present invention is suitable for use as a general molding material, for construction materials such as sheets, optical lenses such as headlights for automobiles and lenses for glasses, and optical recording media. Furthermore, as the polycarbonate or polycarbonate composition of the present invention shows particularly outstanding hardness (surface hardness), it may be used as is in outdoor applications without requiring application of a hard coating layer.

The following is an explanation of the present invention by means of examples, but the invention is not limited to these examples.

The physical properties of the copolycarbonate obtained in the following practical examples and molded product made of this polycarbonate were measured as follows.

Intrinsic viscosity [IV]: This was measured in methylene chloride (0.5 dl/g) at 20° C. using an Ubbelohde viscosimeter.

Optical transmittance: This was measured on a 3 mm thick press sheet using an NDH-200 manufactured by Nihon Denshoku Kogyo K. K.

Haze: This was measured on a 3 mm thick press sheet using an NDH-200 manufactured by Nihon Denshoku Kogyo K. K.

Yellowing index [YE]: X, Y, and Z values measured by the transmission method on a 3 mm thick press sheet using the ND-1001 DP Color and difference meter manufactured by Nihon Denshoka Kogyo K. K. were used in the following equation to calculate the yellowing index.

$$YI = (100/Y) \times (1.277X - 1.060Z)$$

Glass transition temperature (Tg): This was determined by carrying out differential thermal analysis of resin with a rate of temperature increase of 10° C./min using the Model DSC-2 differential scanning colorimeter manufactured by Perkin Elmer Co.

Heat deformation temperature (HDT): This was measured by applying a load of 264 psi to injection-molded specimens measuring 0.5×0.5×5 (inches).

Surface hardness: This was measured as Rockwell hardness (M scale) according to the JIS standard.

EXAMPLE 1

0.30 moles of 1,1-bis(4-hydroxy-3,5-dimethylphenyl) methane (compound shown in Formula [II]), 0.30 moles of bisphenol A (BPA), and 0.67 moles of diphenyl carbonate were placed in a 500 ml reactor equipped with a nickel (Ni) stirrer blade and then stirred for 30 minutes at 180° C. in a $N_2$ atmosphere.

After this, a 15% aqueous solution of tetramethylammonium hydroxide was added so as to make a concentration of tetramethylammonium hydroxide of $2.5 \times 10^{-4}$ moles with respect to a total of 1 mole of the aromatic dihydroxy compound, sodium hydroxide was added in the amount of $1 \times 10^{-4}$ moles with respect to a total of 1 mole of the aromatic dihydroxy compound, and an ester exchange reaction was carried out for 30 minutes at 180° C. in a $N_2$ atmosphere.

Next, the temperature was increased to 210° C., the pressure was gradually decreased to 200 mmHg for 1 hour, the temperature was increased to 240° C. with the pressure at 200 mmHg for 20 minutes, and the pressure was gradually decreased to 150 mmHg for 20 minutes. The pressure was further decreased to 100 mmHg for 20 minutes, it was then reduced to 15 mmHg and a reaction was conducted for 15 minutes, the temperature was elevated to 280° C., and finally, the pressure was reduced to 0.5 mmHg, a reaction was conducted for 1.5 hours, and copolycarbonate having an intrinsic viscosity [IV] of 0.50 dl/g was obtained.

The Rockwell hardness of the polycarbonate obtained was 58, its glass transition temperature (Tg) was 159° C., and its yellowing index (YI) was 1.5.

The measured physical properties of this copolycarbonate are shown in Table 1.

Moreover, before removing the polymer from the reactor, butyl p-toluenesulfonate was added in an amount greater by a molar factor of 2 than the amount of sodium hydroxide added, and agitation was carried out for 15 minutes to obtain the copolycarbonate composition. The intrinsic viscosity [IV], hardness, Tg, and YI of this copolycarbonate composition were identical with that of the above copolycarbonate.

EXAMPLE 2

Copolycarbonate and a copolycarbonate composition were obtained in the same manner as in Practical Example 1, except that 0.45 moles of 1,1-bis(4-hydroxy-3,5-dimethylphenyl)methane and 0.15 mole of bisphenol A (BPA) was used.

The intrinsic viscosity [IV] of the copolycarbonate obtained was 0.50 dl/g, its Rockwell hardness was 71, its glass transition temperature (Tg) was 163° C., and its yellowing index (YI) was 1.6.

The measured physical properties of this copolycarbonate are shown in Table 1.

The intrinsic viscosity [IV], hardness, Tg, and YI of the copolycarbonate composition were the same as those of the above copolycarbonate.

EXAMPLE 3

Copolycarbonate and a copolycarbonate composition were obtained in the same manner as in Practical Example 1, except that 0.30 moles of 2,2-bis(4-hydroxy-3,5-dimethylphenyl)propane and 0.30 moles of bisphenol A (BPA) were used, and the final reaction temperature was 290° C.

The intrinsic viscosity [IV] of the copolycarbonate obtained was 0.50 dl/g, its Rockwell hardness was 54, its glass transition temperature (Tg) was 165° C., and its yellowing index (YI) was 1.6.

The measured physical properties of this copolycarbonate are shown in Table 1.

The intrinsic viscosity [IV], hardness, Tg, and YI of the copolycarbonate composition were the same as those of the above copolycarbonate.

EXAMPLE 4

Copolycarbonate and a copolycarbonate composition were obtained in the same manner as in Practical Example 1, except that 0.45 moles of 2,2-bis(4-hydroxy-3,5-dimethylphenyl)propane and 0.15 moles of bisphenol A (BPA) were used, and the final reaction temperature was 290° C.

The intrinsic viscosity [IV] of the copolycarbonate obtained was 0.50 dl/g, its Rockwell hardness was 65, its glass transition temperature (Tg) was 173° C., and its yellowing index (YI) was 1.7.

The measured physical properties of this copolycarbonate are shown in Table 1.

The intrinsic viscosity [IV], hardness, Tg, and YI of the copolycarbonate composition were the same as those of the above copolycarbonate.

EXAMPLE 5

Copolycarbonate and a copolycarbonate composition were obtained in the same manner as in Practical Example 1, except that 0.30 moles of 1,1-diphenyl-1,1-bis(4-hydroxy-3,5-dimethylphenyl)methane and 0.30 moles of bisphenol A (BPA) were used, and the final reaction temperature was 300° C.

The intrinsic viscosity [IV] of the copolycarbonate obtained was 0.50 dl/g, its Rockwell hardness was 54, its glass transition temperature (Tg) was 175° C., and its yellowing index (YI) was 1.7.

The measured physical properties of this copolycarbonate are shown in Table 1.

The intrinsic viscosity [IV], hardness, Tg, and YI of the copolycarbonate composition were the same as those of the above copolycarbonate.

EXAMPLE 6

Copolycarbonate and a copolycarbonate composition were obtained in the same manner as in Practical Example 1, except that 0.45 moles of 1,1-diphenyl-1,1-bis(4-hydroxy-3,5-direthylphenyl)methane and 0.15 moles of bisphenol A (BPA) were used, and the final reaction temperature was 300° C.

The intrinsic viscosity [IV] of the copolycarbonate obtained was 0.50 dl/g, its Rockwell hardness was 65, its glass transition temperature (Tg) was 188° C., and its yellowing index (YI) was 1.8.

The measured physical properties of this copolycarbonate are shown in Table 1.

The intrinsic viscosity [V], hardness, Tg, and YI of the copolycarbonate composition were the same as those of the above copolycarbonate.

Comparison Example 1

Polycarbonate was obtained in the same manner as in Practical Example 1, except that the compound shown in Formula [I] used as the aromatic dihydroxy compound in Practical Example 1 was not used, and 0.6 moles of bisphenol A (BPA) were used.

The intrinsic viscosity [IV] of the polycarbonate obtained was 0.50 dl/g, its Rockwell hardness was 32, its glass transition temperature (Tg) was 149° C., and its yellowing index (YI) was 1.5.

The measured physical properties of this copolycarbonate are shown in Table 1.

TABLE 1

| | Aromatic dihydroxy compound, BPA/[II] molar ratio, <[II] compound> | Intrinsic viscosity IV (dl/g) | Optical transmittance (%) | Haze (%) | Yellowing index YI | Glass transition temperature T g (°C.) | Rockwell hardness (M scale) |
|---|---|---|---|---|---|---|---|
| Example 1 | 0.30/0.30 (50/50) <1,1-bis(4-hydroxy-3,5-dimethylphenyl)methane> | 0.50 | 90 | 0.8 | 1.5 | 159 | 58 |
| Example 2 | 0.15/0.45 (25/75) <1,1-bis(4-hydroxy-3,5-dimethylphenyl)methane> | 0.50 | 90 | 0.8 | 1.6 | 163 | 71 |
| Example 3 | 0.30/0.30 (50/50) <2,2-bis(4-hydroxy-3,5-dimethylphenyl)propane> | 0.50 | 90 | 0.8 | 1.6 | 165 | 54 |
| Example 4 | 0.15/0.45 (25/75) <2,2-bis(4-hydroxy-3,5-dimethylphenyl)propane> | 0.50 | 90 | 0.8 | 1.7 | 173 | 65 |
| Example 5 | 0.30/0.30 (50/50) <1,1-diphenyl-1,1-bis(4-hydroxy-3,5-dimethylphenyl)methane> | 0.50 | 90 | 0.8 | 1.7 | 179 | 54 |
| Example 6 | 0.15/0.45 (25/75) <1,1-diphenyl-1,1-bis(4-hydroxy-3,5-dimethylphenyl)methane> | 0.50 | 90 | 0.8 | 1.8 | 188 | 65 |
| Comparison Example 1 | 0.60/0 (100/0) | 0.50 | 90 | 0.8 | 1.7 | 149 | 32 |

We claim:

1. A composition comprising: a copolycarbonate containing units derived from two or more different aromatic dihydroxy compounds comprising component units shown in formula I in the amount of 50–99 mole %

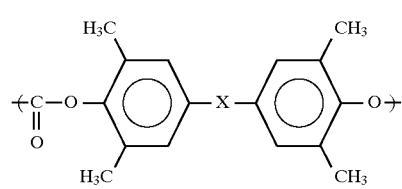

wherein

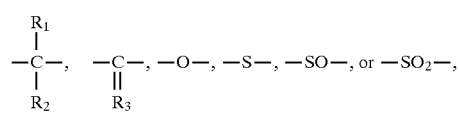

wherein $R^1$ and $R^2$ are hydrogen atoms on monovalent hydrocarbon groups, and $R^3$ is a bivalent hydrocarbon group, and a reaction product of an epoxy compound with an acidic compound.

2. The composition of claim 1, having an intrinsic viscosity of 0.2–1.2 dl/g, in methylene chloride at 20° C.

3. The composition of claim 1, wherein the composition has a Rockwell hardness (M Scale) of 45–90.

* * * * *